Patented May 17, 1938

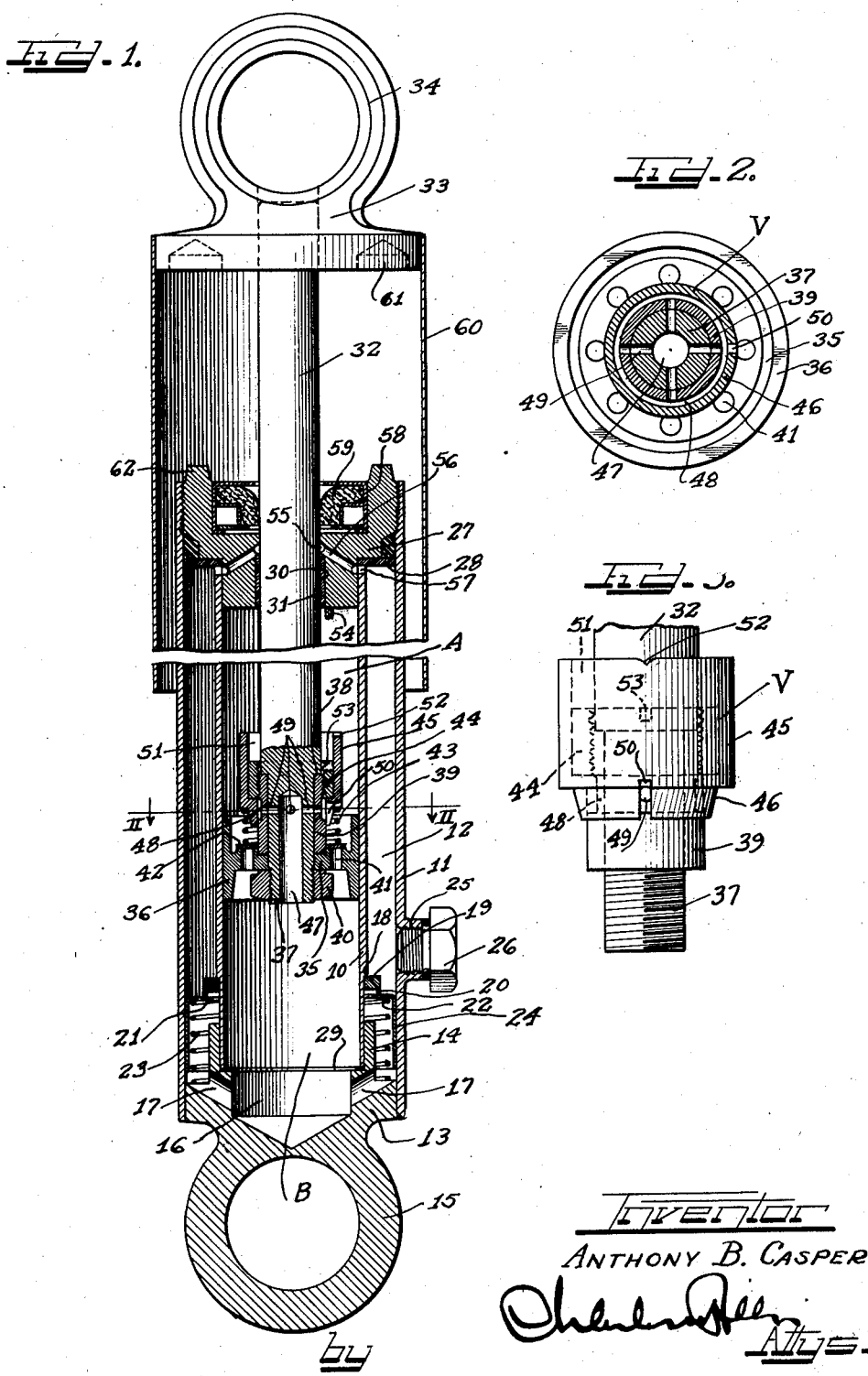

2,117,837

UNITED STATES PATENT OFFICE 2,117,837

HYDRAULIC SHOCK ABSORBER

Anthony B. Casper, Buffalo, N. Y., assignor to Houde Engineering Corporation, Buffalo, N. Y., a corporation of New York Application September 25, 1936, Serial No. 102,505

20 Claims. (Cl. 188—88)

This invention relates to hydraulic shock absorbers, particularly the direct acting type in which the cylinder is of tubular form and with the piston and piston rod reciprocable therein.

The important object of the invention is to provide improved valving structure and arrangement for efficiently controlling and metering the fluid flow during both compression and rebound movement of the vehicle springs with which the shock absorber is associated.

The various features of the invention are incorporated in the structure disclosed on the drawing, in which drawing:

Figure 1 is a diametral section of the shock absorber;

Figure 2 is an enlarged section through the piston structure on plane II—II Figure 1; and Figure 3 is a side elevation of the piston structure.

The structure shown comprises an inner or cylinder tube 10, and an outer tube 11 concentric with the inner tube but spaced therefrom to provide a reservoir 12 for hydraulic fluid. The lower cylinder head 13 fits into and is secured to the lower end of the tube 11 and has the annular flange 14 into which the lower end of the cylinder tube extends and is secured thereto, the head having an eye or loop 15 for receiving coupling fittings (not shown) for securing the cylinder structure to a support, as for example, the axle of an automotive vehicle.

The head 13 has the space 16 therein open to the lower end of the cylinder tube and connected by passages 17 with the lower end of the reservoir space 12. The lower end of the cylinder tube is of slightly reduced diameter so as to provide an annular shoulder 18 against which abuts an annular valve seat member 19, the seat member having the depending annular seat ridge 20 thereon. An annular valve disc 21 cooperates with the seat 20 and has one or more restricted passages or orifices 22 therethrough which are located outside of the seat ridge 20 so as to be exposed at all times for fluid flow between the lower end of the cylinder and the reservoir space 12. A spring 23 between the head 13 and the valve disc tends to hold the valve against the seating ridge so as to expose only the orifices 22 to fluid flow, but when the valve is unseated fluid may flow past the valve seat and around the inner edge of the valve. In order to assure proper movement of the valve disc and to prevent canting thereof, it may be provided with a cylindrical guide skirt 24 depending therefrom and engaging with the inner side of the outer tube 11.

Just above the line of the valve 21, the reservoir tube 11 has the filler opening 25 for hydraulic fluid, a plug 26 normally closing the opening.

An upper head 27 for the cylinder tube and the outer tube has threaded engagement with the upper end of the outer tube and has a plug end fitting into the upper end of the cylinder tube, a washer 28 of suitable material being interposed between the head and the end of the cylinder tube. At its lower end the outer tube 11 is secured to the head 13 as for example by welding and the lower end of the cylinder tube has driving fit in the flange 14. When the upper head 27 is screwed into the outer tube 11, it will force the cylinder tube securely into the flange 14 of the lower head, a suitable gasket 29 being preferably interposed to assure a fluid tight fit.

The head 27 has the bore 30 lined by a bearing bushing 31 for the piston rod 32 which is secured at its upper end to a fitting 33 provided with an eye 34 for engagement with suitable supporting means (not shown) for securing the piston rod to a support as for example the chassis of the vehicle.

The piston structure comprises the piston cross-head 35 with the guide skirt structure 36 thereon for engaging with the cylinder wall 10. The piston rod has the lower end 37 of reduced diameter to leave a shoulder 38, the reduced end receiving a sleeve 39 abutting the shoulder. The piston cross-head 35 is bored to receive the reduced end 37 below the sleeve 39 and a nut 40 is then applied to the reduced end to securely clamp the piston and the sleeve to the piston rod. The cross-head 35 of the piston has one or more ports or passages 41 therethrough with which an annular valve disc 42 cooperates, the valve being normally held seated by a spring 43 against the top of the piston cross wall 35 to close the ports 41.

The upper end of the sleeve 39 is threaded for threaded engagement by a ring 44 for guiding and adjusting a valve structure V. This valve structure comprises a tubular body 45 engaging the ring 44, the body having the depending annular flange 46 intimately surrounding the sleeve 39 below the ring 44. The spring 43, which at its lower end abuts the valve 42, encircles at its upper end the flange 46 and abuts the lower end of the valve body 45 and tends to hold the valve structure V with the upper end of the flange 46 against the lower edge of the ring 44.

The lower end of the piston rod 32 has the bore 47, and the sleeve 39 has the annular external channel 48 connected with the bore 47 through one or more passages 49 extending through the sleeve 39 and the piston rod. The channel 48 is in alignment with the flange 46 on the valve V and this flange has a cross slit 50 communicating with the channel, the flange 46 extending a distance below the lower edge of the channel so that the size of the orifice provided by the slit 50 is determined by the distance between the upper end of the slit and the lower edge of the channel.

The piston structure divides the space within the cylinder 10 into upper and lower hydraulic working chambers A and B. In service the shock absorber is connected between the vehicle chassis and the axle and during compression movement of the vehicle spring the piston moves downwardly to force the fluid from the lower chamber B to the upper chamber A, the pressure unseating the valve 42 for comparative free flow of the fluid through the ports 41, some of the fluid also flowing through the piston rod bore and through the valve orifice 50. Owing to the volumetric differential between the working chambers on account of the volume of the piston rod, the upper chamber A cannot accommodate all of the fluid displaced from the lower chamber B and the surplus fluid therefore flows into the reservoir space 12 through the restricted orifices 22 in the valve 21 which is held seated against its seat 20 by the pressure during downward movement of the piston and these orifices, by resisting the flow of the fluid, will provide the necessary shock absorber resistance during downward travel of the piston.

During rebound movement of the vehicle spring, the piston travels upwardly to force the fluid from the chamber A to the chamber B. The pressure of the fluid holds the valve 42 seated and the ports 41 are therefore closed so that the only available flow passage is by way of the restricted orifice slit 50, the collecting channel 48, the passages 49 and the bore 47 of the piston rod. Owing to the differential volume of the chambers A and B, the suction or vacuum created in the lower chamber B will cause unseating of the valve 21 and comparatively free flow of fluid from the reservoir 12 past the valve and into the chamber B by way of the passages 17 and the space 16 in the head 13. The restricted orifice 50 determines the shock resistance during spring rebound movement and upward travel of the piston, this resistance being greater than the shock absorber resistance during compression movement of the spring.

During abnormal rebound movement of the vehicle spring, the piston and cylinder structures may be moved apart the full distance and if the piston is allowed to strike the upper head 27 it might cause serious damage. However, provision is made to prevent this. It will be noted that the valve body 45 is normally held by the spring 43 with its outer end a distance above the ring 44 so as to provide the annular space 51. With this arrangement, as the piston reaches the upper end of the cylinder, the valve body will encounter the head 27 which then closes the space 51 except for a slight relief outlet 52 which may be formed by notching the upper edge of the valve body 45. As the piston continues upward movement after engagement of the valve body 45 with the head 27, a dash pot action takes place as the space 51 is decreased in volume and the outflow of the fluid therefrom is retarded by the restricted vent 52. Furthermore, as the piston structure moves upwardly relative to the valve body 45, the vertical length of the orifice 50 will be decreased so that the resistance through the orifice, added to the resistance through the vent 52, will result in gradual hydraulic checking of the piston structure so that it cannot violently strike the head 27.

The size of the orifice 50 can be adjusted by changing its vertical length by turning of the threaded ring 44. In order that this may be readily accomplished after the shock absorber has been assembled, the ring is provided with a notch 53 in its upper edge which is in vertical alignment with a tongue 54 on the lower end of the head 27. To make adjustment, the piston is pulled out its full distance, the valve body 45 being then shifted downwardly and the tongue 54 entering the notch 53. Now upon relative turning of the cylinder and the piston rod, the ring is turned for upward or downward axial movement resulting in corresponding vertical shift of the slit 50 relative to the lower edge of the channel 48 and in corresponding increase or decrease of the orifice passageway size.

To prevent leakage from the upper end of the cylinder, the head 27 may be provided with the annular recess 55 above the bushing 30 which recess will tend to intercept any fluid leaking past between the bushing and the piston rod, the intercepted fluid being returned to the reservoir by way of one or more channels 56 through the head 27 and passages 57 through the cylinder wall 10 at the upper end thereof. As a further security against leakage, a suitable packing assembly is seated in the recess 58 in the upper end of the head 27, this packing material including a packing member 59 of suitable material intimately held around and against the piston rod to prevent the escape of any fluid during outward movement of the piston structure and rod. Should any leakage fluid find its way upwardly beyond the intercepting channel 55, it will be stopped by the packing 59 and then during downward movement of the piston structure the fluid will find its way back to the recess for return to the reservoir.

A tubular shield 60 is secured to the piston rod fitting 33 and depends therefrom to surround the reservoir tube 11.

To permit ready assembly and disassembly of the cylinder and piston structure, the fitting 33 may be provided with sockets 61 for receiving the tongues 62 on the head 27. By this tongue and socket arrangement, the cylinder head 27 may be readily screwed to the tube 11 for assembly of the structure or unscrewed therefrom for disassembly.

I have shown a practical and efficient embodiment of the various features of my invention but I do not desire to be limited to the exact construction, arrangement and operation shown and described as changes and modifications may be made without departing from the scope of the invention.

I claim as follows:

1. A hydraulic shock absorber of the direct acting type comprising a cylinder, a piston and a piston rod extending therefrom, said piston rod having a fluid flow passageway extending therethrough from one side of the piston to the other, and an annular valve member surrounding said piston rod and having a restricted orifice communicating with one end of said passage for metering the flow therethrough during relative movement of the cylinder and piston, said valve being axially shiftable for adjustment of the size of said orifice.

2. A hydraulic shock absorber comprising a cylinder, a piston for the cylinder having a piston rod extending therefrom, said rod having a bore at its piston end open to one side of the piston, an annular channel surrounding the piston rod and communicating with said bore at the opposite side of the piston, and an annular valve member surrounding said channel and having an orifice slit extending across said channel for metering the fluid flow from one side of the piston to the other during relative movement of the piston and cylinder.

3. A hydraulic shock absorber comprising a cylinder, a piston for the cylinder having a piston rod extending therefrom, said rod having a bore at its piston end open to one side of the piston, an annular channel surrounding the piston rod and communicating with said bore at the opposite side of the piston, and an annular valve member surrounding said channel and having an orifice slit extending across said channel for metering the fluid flow from one side of the piston to the other during relative movement of the piston and cylinder, said valve being axially movable for exposing more or less of said orifice slit to said channel.

4. A hydraulic shock absorber comprising a cylinder, a piston structure within the cylinder and a piston rod structure extending therefrom to the exterior of the cylinder, said piston rod structure having a bore communicating at one end with the cylinder at one side of the piston structure, a port connecting said bore with the cylinder at the opposite side of said piston structure, a ring having threaded engagement with said piston rod structure above said port, an annular valve member surrounding said ring and seated thereon, said valve member having a metering orifice for cooperating with said port to control the fluid flow from one side of the piston structure to the other during relative movement of the piston structure and cylinder, and means whereby said ring may be rotated for effecting axial movement of said valve member for adjustment of the overlap of said orifice and port for determining the resistance to the fluid flow.

5. A hydraulic shock absorber comprising a cylinder, a piston and a piston rod extending therefrom through an end wall of the cylinder, said piston rod having a bore extending from the inner side of the piston to the outer side thereof, a channel surrounding the piston rod above the outer end of the piston and a passage connecting said channel with said bore, an annular valve surrounding said channel and having an orifice slot therethrough crossing said channel, a spring tending to hold said valve for normal exposure of said orifice to said channel, said orifice metering the flow from one side of the piston to the other during relative movement of the piston and cylinder, said valve being arranged to engage said cylinder end wall during extreme outward movement of the piston whereby said valve will be axially shifted against the resistance of said spring to decrease the exposure of said orifice to said channel whereby to increase the fluid flow resistance through said orifice and thereby hydraulically check further relative movement of the piston and cylinder.

6. A hydraulic shock absorber comprising a cylinder, a piston structure comprising a piston and a stem extending therefrom through an end wall of said cylinder, means providing a passageway through said piston structure from the inner to the outer side of the piston, an annular valve on said piston structure having a metering orifice cooperating with the outer end of said passageway for metering the flow therethrough during outward movement of the piston in the cylinder, adjusting means for adjusting said valve for the degree of exposure of said orifice to fluid flow, said valve being arranged for impact with said cylinder end wall during abnormal outward movement of said piston whereby said valve will be axially shifted to decrease the exposure of said orifice whereby to dampen further movement of said piston.

7. A hydraulic shock absorber comprising a cylinder, a piston structure comprising a piston and a piston rod extending therefrom, means providing a passageway for fluid flow from the inner end of the cylinder to the outer end thereof, an annular valve on the piston rod having a metering orifice exposed to the outer end of said passageway for metering the flow therethrough during outward movement of the piston by the rod, adjusting means for adjusting the exposure of said orifice to said passageway whereby to adjust for resistance to the fluid flow, and means operable independently of said adjusting means for decreasing the exposure of said orifice upon abnormal outward movement of said piston structure in said cylinder.

8. A hydraulic shock absorber comprising a cylinder, a piston structure comprising a piston and a rod extending therefrom through the outer end wall of the cylinder, a fluid flow passageway through the piston structure from the inner to the outer side of the piston, an annular support on the piston rod above the piston, a valve structure comprising an annular body engaging and axially shiftable on said support, said valve structure having an orifice cooperating with the outer end of said passageway for metering the flow therethrough during outward movement of the piston structure in the cylinder, said annular valve body extending normally a distance above said support to provide an annular space, said annular space having a vent outlet, abnormal outward movement of said piston structure in said cylinder resulting in engagement of the outer end of said annular body with said end wall and closure of said annular space by said end wall to form a dash pot upon further outward movement of said piston structure relative to said valve member from which dash pot the outflow of fluid is restricted by said vent and further outward movement of said piston structure hydraulically checked.

9. A hydraulic shock absorber comprising a cylinder, a piston structure comprising a piston head and a stem structure extending therefrom through an end wall of the cylinder, ports through the piston head and a valve above the head for cooperating with said ports, a channel surrounding the stem structure above the piston head and a passageway through the piston rod structure between said channel and the cylinder below said head, an annular valve surrounding said channel and having a metering orifice crossing the channel, an annular support on the rod structure above said valve, a common spring tending to hold said annular valve against said support and said first mentioned valve against said head, said support being movable to cooperate with said spring for shifting said annular valve for adjusting the orifice exposure to said channel.

10. A hydraulic shock absorber comprising a cylinder, a piston for the cylinder having a piston rod extending therefrom, said rod having a bore at its piston end open to one side of the piston, an annular channel surrounding said rod and communicating with said bore at the opposite side of the piston, and an annular valve member surrounding said channel and having a restricted orifice for communicating with said channel for metering the fluid flow from one side of the piston to the other during relative movement of the piston and cylinder.

11. A hydraulic shock absorber comprising a cylinder, a piston for the cylinder having a piston rod extending therefrom, said rod having a bore at its piston end open to one side of the piston, an annular channel surrounding said rod and communicating with said bore at the opposite side of the piston, and an annular valve member surrounding said channel and having a restricted orifice for communicating with said channel for metering the fluid flow from one side of the piston to the other during relative movement of the piston and cylinder, said valve being movable crosswise of said channel whereby to adjust for the desired degree of exposure of said orifice to said channel.

12. A hydraulic shock absorber comprising a cylinder, a piston structure comprising a piston and a piston rod extending therefrom, means providing a passageway for fluid flow from the inner end of the cylinder to the outer end thereof, an annular valve on the piston rod having a metering orifice exposed to the outer end of said passageway for metering the flow therethrough during outward movement of the piston by the rod, adjusting means for adjusting the exposure of said orifice to said passageway whereby to adjust for resistance to the fluid flow, yielding means holding said valve in adjusted position during normal operation of the shock absorber, and means whereby said valve will be shifted to decrease the exposure of said orifice to said passageway during abnormal outward movement of said piston structure in said cylinder.

13. In a hydraulic shock absorber, a cylinder structure, a piston structure comprising a piston and a piston rod extending therefrom to the exterior of the cylinder, means defining a passageway through said piston rod for the flow of hydraulic fluid from one side of the piston to the other during relative movement of said structures, an annular valve adjustable axially on one of said structures for controlling the flow through said passageway, adjusting means for said valve on said other structure but displaced from said valve during relative movement of said structures for normal operation of the shock absorber, said adjusting means being brought into adjusting engagement with said valve during an abnormal relative position of said structures and being then effective upon relative rotational movement of said structures for effecting axial setting of said valve structure to another position of adjustment of said passageway for control of subsequent normal operation of said shock absorber.

14. In a hydraulic shock absorber of the direct acting type comprising a cylinder structure, a piston structure comprising a piston and a piston rod extending therefrom through one end of the cylinder structure, means providing a passageway through the piston rod for the flow of hydraulic fluid from one side of the piston to the other during relative longitudinal movement of said structures, an axially adjustable valve for said passageway concentric with one of said structures and inaccessible from the exterior of the shock absorber after assembly thereof, and setting means on the other structure effectively cooperable with said valve only during relative rotary movement of said structures to effect axial setting of said valve to another position of control of said passageway for subsequent relative longitudinal movement of said structures during operation of the shock absorber.

15. A hydraulic shock absorber of the direct acting type comprising a cylinder structure having end closures, a piston structure comprising a piston in the cylinder and a piston rod extending therefrom through one of said end closures, means defining a passageway through the piston rod for the flow of hydraulic fluid during relative longitudinal movement of the structures, an annular valve structure surrounding the piston rod for cooperating with said passageway to determine the resistance to flow therethrough, adjusting means for said valve structure located at one end of the cylinder structure, means whereby relative longitudinal movement of said structures to a certain position will bring said valve structure and adjusting means in cooperative relation, and means whereby relative rotary movement of said structures will then effect axial shift of said valve structure to another position of control of said fluid flow through said passageway for subsequent relative longitudinal movement of said structures and normal operation of the shock absorber.

16. A hydraulic shock absorber of the direct acting type comprising a cylinder structure having end closures, a piston structure comprising a piston and a piston rod extending therefrom through one of the cylinder end closures, means defining a passageway through said piston rod for the flow of hydraulic fluid from one side of the piston to the other during relative longitudinal movement of said structures, a valve structure adjustable longitudinally on the piston structure for cooperating with said passageway to determine the resistance to flow therethrough, and adjusting means for said valve at one end of said cylinder, means effective upon relative longitudinal movement of said structures for bringing said valve structure into engagement with said adjusting means, and means whereby relative rotational movement of said structures will then effect setting of said valve structure to another position on said piston rod relative to said passageway for control with such setting of the fluid flow through said passageway during subsequent relative longitudinal movement of said structures for normal operation of the shock absorber.

17. A hydraulic shock absorber of the direct acting type comprising a cylinder structure, a piston structure comprising a piston and a piston rod extending therefrom to the exterior of the cylinder, a passageway through the piston rod for flow of hydraulic fluid from one side of the piston to the other, a valve structure concentric with the piston structure for controlling said passageway, said valve structure being axially adjustable to determine the resistance to flow through said passageway, adjusting means for said valve within and at one end of the cylinder engageable with said valve structure when the piston is at such end of the cylinder, and means whereby relative rotational movement of said structures will then effect axial movement of the valve structure by said adjusting means to a new position of control of such passageway for subsequent operation of the shock absorber.

18. A hydraulic shock absorber comprising a cylinder, a piston structure comprising a piston and a rod extending therefrom through the outer end wall of said cylinder, means providing a passageway for the flow of fluid from one side of the piston to the other during outward movement of the piston structure, a movable valve structure for controlling the flow through said passageway, and means comprising said piston structure, said end wall and said valve structure for forming a dashpot for hydraulically checking further outward movement of the piston structure after abnormal outward movement thereof, the arrangement being such that said valve structure is engaged by said end wall during operation of said dashpot means to be moved thereby to increase the resistance to flow through said passageway whereby to assist in checking the movement of the piston structure.

19. In a hydraulic shock absorber of the direct acting type, a cylinder structure, a piston structure comprising a piston and a piston rod extending therefrom through one end wall of the cylinder structure, means providing a passageway for the flow of hydraulic fluid from one side of the piston to the other during relative longitudinal movement of said structures, a valve concentric with said structures and a support for said valve having threaded engagement with said piston rod for axial displacement thereof to adjust said valve for control of fluid flow through said passageway, and setting means within the cylinder structure effectively cooperable with said valve support only during relative rotary movement of said structures for rotary movement of said valve support to effect axial setting of said valve to another position of control of said passageway for subsequent relatively longitudinal movement of said structures during operation of the shock absorber.

20. In a hydraulic shock absorber of the direct acting type, a cylinder structure, a piston structure comprising a piston and a piston rod extending therefrom through an end of the cylinder structure, means providing a passageway through the piston rod for the flow of hydraulic fluid from one side of the piston to the other during relative longitudinal movement of said structures, an adjustable valve surrounding said passageway for controlling the flow therethrough, and means entirely within said cylinder structure for cooperation with said valve upon relative rotation of said structures for adjusting and setting said valve for subsequent normal operation of the shock absorber.

ANTHONY B. CASPER.